United States Patent [19]

Cain et al.

[11] Patent Number: 5,641,528
[45] Date of Patent: Jun. 24, 1997

[54] GLAZING COMPOSITION

[75] Inventors: Frederick William Cain, Voorburg; Adrian David Hughes, The Hague; Jan Dirk Lakeman, Zaandam, all of Netherlands

[73] Assignee: Loders-Croklaan B.V., Wormerveer, Netherlands

[21] Appl. No.: 522,106

[22] Filed: Aug. 31, 1995

[30] Foreign Application Priority Data

Aug. 31, 1994 [EP] European Pat. Off. ............... 94202480

[51] Int. Cl.⁶ .................................................. A23D 7/00
[52] U.S. Cl. ............................ 426/99; 426/606; 426/607
[58] Field of Search ............................ 426/606, 607, 426/99, 610

[56] References Cited

U.S. PATENT DOCUMENTS

| 5,147,676 | 9/1992 | Talbot | 426/601 |
| 5,151,292 | 9/1992 | Zwikstra | 426/601 |
| 5,366,752 | 11/1994 | Cain et al. | 426/607 |
| 5,431,948 | 7/1995 | Cain | 426/607 |

FOREIGN PATENT DOCUMENTS

| 0 483 414 A1 | 5/1992 | European Pat. Off. | A23D 9/00 |
| 0 503 694 A1 | 9/1992 | European Pat. Off. | A23D 9/00 |

*Primary Examiner*—Carolyn Paden
*Attorney, Agent, or Firm*—Cushman Darby & Cushman IP Group Pillsbury Madison & Sutro LLP

[57] ABSTRACT

Blends of triglycerides A and B have excellent gloss and anti-clumping properties, when used as glazing agent for food products.

A being a triglyceride with $N_{20}<12$ and a RTP$\geq$25 hrs.
B being a triglyceride with $N_{35}<40$.

Amounts of A and B

80–98% A
20–2% B

13 Claims, No Drawings

GLAZING COMPOSITION

BACKGROUND OF THE INVENTION

Food products, such as confectionary products like wine-gums, pastils or starch-gelling type sweets, but also fruits and raisins are appreciated by its users, when they have a nice gloss. Therefore these products were and are treated with a glazing composition, that can provide the required gloss to the products. Commercial glazing agents, that are available so far, are based on blends of MCT-oils or high stability oils (=HSO) and natural or synthetic waxes (e.g. bees wax). MCT-oils are synthetic triglycerides with fatty acid residues with a chain length of 4–10 C-atoms; high stability oils are natural oils or fractions of natural oils or fractionated, hardened vegetable fats or blends thereof, that display high rancimat induction period (=RIP)-values (and are therefore resistant to oxidation).

It was known, that the use of the MCT-oil or HSO-only did not lead to satisfactory results. In order to come to acceptable results with respect to gloss it was known to the man skilled in the art that the presence of a natural or synthetic wax was essential. However, the presence of such waxes also have a couple of drawbacks, e.g. it was found, that confectionery sweets, such as wine-gums provided with a coating based on MCT-oil and a wax clumped together, so that a less attractive clump of sweets were present in the coated (or glazed) products, instead of individually separated sweets. Moreover indications were found, that waxes are less suitable for food products, as some health-risks might be involved in its use. Moreover natural waxes are expensive and not easily available. Attempts, made so far to improve this clumping led to solutions, wherein the use of an alcohol carrier was required. This requirement complicates the processing and is less acceptable because of fire-risks and the need of special equipment, like vents etc.

In order to overcome above drawbacks and to come to a composition, that can be applied as a glazing composition for food products, resulting in products with an improved gloss and a reduced clumping together, we have studied whether the waxes in the known glazing compositions could be replaced or avoided. This study has resulted in new compositions, which fulfil all above requirements.

SUMMARY OF THE INVENTION

Therefore our invention concerns in the first instance novel blends of triglyceride-compositions A and B, wherein:

A. is a triglyceride-composition with an unstabilized solid fat content at 20° C. (NMR-pulse) of less than 12, preferably less than 7, more preferably between 0 and 5, having a rancimat induction period (=RIP-value) of more than 25 hrs, preferably more than 35 hrs at 120° C.

B. is a triglyceride-composition with an unstabilized solid fat content at 35° C. (NMR-pulse) of more than 40, preferably more than 60, most preferably more than 75, while A and B are present in amounts of:
80–98 wt % A and
20–2 wt % B.

compounds A and B are preferably present in amounts of:
90–97 wt % of A and
10–3 wt % of B In above blends less than 30 wt %, preferably less than 20 wt % of the triglycerides present have a melting point of 20°–35° C.

In order to fulfil the RIP-value for fat A it is preferred that fat A has a $C_{18:2}$-content of less than 30 wt %, preferably less than 15 wt %.

DETAILED DESCRIPTION OF THE INVENTION

Examples of fat A are: olein-fraction of hardened vegetable oil(s), high oleic sunflower oil or MCT-oils, preferably having an $N_{10}<20$, and $N_{20}=0-10$ (NMR-pulse: not stabilized), Natural liquid oils or fractions thereof, optionally provided with added natural or synthetic anti-oxidants, such as ascorbyl derivatives or tocopherols, or enzymes, such as glucoseoxidase or catalase are the most preferred examples of fat A.

Although a broad variety of fats B can be applied, the most useful fats B have a ($C_{16}$–$C_{24}$)-content of at least 60 wt %, preferably at least 80 wt %, most preferably at least 90 wt %.

Suitable examples of fats B are palm oil stearin, hardened bean oil m.pt 65° C., hardened palm oil m.pt 58° C., hardened rapeseed oil m.pt 70° C. and hardened sunflower oil m.pt 65° C.

Although we have a preference for the use of non-hydrogenated fractions with a melting point of more than 50° C., preferably more than 55° C. as fat B, hardened, non-tropical oils or fractions thereof can also be applied as fat B.

Part of the invention is also a process for improving the gloss and for reducing the clumping together of confectionary products, such as wine-gums, pastils, starch-gelling type sweets, or fruits or raisins, wherein the confectionary product, the fruit or the raisins are provided with a thin-layer of the blend of triglycerides according to our invention.

The food products can be provided with our glazing composition by any method that is suitable. Spraying is, however, preferred. The amount of glazing composition suitably ranges from 0.05–2 wt % (on product).

The food products provided with our glazing agent are also part of the invention. For completeness sake, it can be mentioned that blends of high stability oils and a hardened fat fraction are known from EP 464.881. The blends are used for coating of chocolate-compositions. Nothing is disclosed about anti-clumping properties. More over the blends only contain 5–30 wt % of the high stability oil.

EXAMPLES

Example 1

Blends were made with the composition as indicated in the table below.

| Composition | HSO | MCT-oil | Bees Wax | hard palm oil |
|---|---|---|---|---|
| A | — | 95 | 5 | — |
| B | — | 100 | — | — |
| C* | — | 95 | — | 5 |
| D* | 95 | — | 5 | — |
| E* | 95 | — | — | 5 |
| F | 100 | — | — | — |

*according to the invention

The HSO applied was a commercial high stability oil (Durkex—500°, van den Bergh Foods, USA). Its $N_{20}=3$; its RIP=45 hrs. The MCT-oil was a commercial product (Stabilox 865 from Loders Croklaan; its $N_{20}=0$; its RIP= >>70 hrs.

The hardened palm oil had a melting point of 50° C. Note that RIP-values were measured at 120° C.

Example 2

Wine-gums were sprayed with 0.2 wt % (on product) with above compositions A–F. The gloss of the products were all similar (=good), however, the number of wine-gums that clumped together was less, when using our compositions C and E, compared with using the other compositions. The results are given below:

| Composition | Number of sweets | Number of sweets in clumps | % of unclumped sweets |
| --- | --- | --- | --- |
| A | 150 | 40 | 73 |
| B | 150 | 76 | 49 |
| C | 154 | 30 | 83 |
| D | 152 | 30 | 81 |
| E | 154 | 20 | 87 |
| F | 148 | 65 | 56 |

Example 3

Soft Liquorice Pieces

The following blends have been used:

95/5 Stabilox 865/bees wax

95/5 Stabilox 865/fully hardened soybean oil, slip.m.pt 65° C.

Stabilox 865 is an MCT-oil.

The glazing was carried out using a Brucks panning machine. The pieces of liquorice were cleaned and batches of 900 g were glazed. The following process conditions were employed:

| | |
| --- | --- |
| dosage of glazing agent: | 2 g/kg |
| temp. of blend | 78–83 C. |
| batch size | 900 g |
| pan speed | 25 rev/min |
| air-temperature | 60–72 C. |
| residence time (glazing) | 10 min. |
| cooling time | 15 min. |
| air temp. | 29–17 C. |

(Residence time is time from the addition of the blend to the start of the cooling, i.e. time allowed for the distribution of the glazing agents.)

Procedure

Before the glazing process started a precoat was applied on the inside of the pan. Then the pan (preheated using warm air at 60° C. to 72° C.) was filled with the batch of liquorice. After 3 to 5 minutes the blend was applied by means of a pipette. Panning was carried out for 10 minutes to get an even distribution of the blend over the pieces of liquorice. If individual pieces stuck to the wall of the pan, then these were loosened manually. During the panning, a stream of warm air (60° C. to 72° C.) from a duct was blown into the pan. The heating device was then switched off and cool air (28° C. reducing to 17° C.) was applied for 15 minutes to cool the liquorice pieces. The pan was then emptied.

After 4 weeks storage at ambient, the gloss and stickiness of the liquorice pieces were evaluated. Gloss was evaluated visually using a 5 point scale.

The stickiness was measured by emptying very carefully a container with the pieces of liquorice that had been stored at ambient. Then the number of clumps was counted.

1. Gloss
 1- no gloss
 5=high gloss.

| | |
| --- | --- |
| soft liquorice pieces | |
| gloss | |
| 95/5 Stabilox 865/beeswax | 2.0 |
| 95/5 Stabilox 865/hardened soybeanoil 65° C. | 2.0 |
| Stickiness. | |
| | number of clumps |
| 95/ Stabilox 865/beeswax | 4 |
| 95/5 Stabilox 865/hardened soybeanoil 65° C. | 3 |

Example 4

Hard Liquorice Pieces

The following blends have been used:

95/5 Durkex 500/bees wax

95/5 Durkex 500/palm oil stearin

The palm oil stearin had an N-35 of 78%. The process of glazing was the same as described under soft liquorice pieces except for:

i) pan speed —20 rpm ii) Residence time=5 minutes

After 4 weeks storage at ambient, the glass and stickiness of the products were evaluated as above.

| | |
| --- | --- |
| Gloss. | |
| 5= high gloss. | |
| 1- no gloss. | gloss |
| 95/5 Durkex 500/bees wax. | 3.5 |
| 95/5 Durkex 500/palm oil stearin | 3.0 |
| Stickiness. | number of clumps |
| 95/5 Stabilox 865/bees wax. | 31 |
| 95/5 Durkex 500/palm oil stearin | 29 |

We claim:

1. Glazing composition for improving gloss and for reducing clumping together of confectionary products comprising a blend of triglyceride-compositions A and B, wherein:

A. is a triglyceride-composition with an unstabilized solid fat content at 20° C. (NMR-pulse) of less than 12, having a rancimat induction period (=RIP-value) of more than 25 hours, at 120° C.

B. is a triglyceride-composition with an unstabilized solid fat content at 35° C. (NMR-pulse) of more than 40, wherein fat B is selected from the group consisting of hardened palm oil m.pt 58° C., a non-hydrogenated fraction with a melting point of more than 50° C., and a hardened, non-tropical oil or a fraction thereof while A and B are present in amounts of:

80–98 wt % A and

20–2 wt % B.

2. Blend according to claim 1, wherein A and B are present in amounts of:

90–97 wt % of A and

10–3 wt % of B.

3. Blend according to claims 1 or 2, wherein less than 30 wt % of the triglycerides present have a melting point of 20°–35° C.

4. Blend according to claim 1, wherein fat A has a $C_{18:2}$-content of less than 30 wt %.

5. Blend according to claim 1, wherein fat A is selected from the group, consisting of:

olein-fraction of hardened vegetable oil(s), high oleic sunflower oil or MCT-oils, preferably having an $N_{10}<20$, and $N_{20}=0–10$ (NMR-pulse; not stabilized).

6. Blend according to claim 1, wherein fat B has a ($C_{16}$–$C_{24}$) content of at least 60 wt %.

7. Blend according to claim 6 wherein fat B has a ($C_{16}$–$C_{24}$)-content of at least 80 wt % and a melting point of more than 55° C.

8. Blend according to claim 1, wherein fat B is selected from the group consisting of palm oil stearin, hardened bean oil m.pt 65° C., hardened rapeseed oil m.pt 70° C. and hardened sunflower oil m.pt 65° C.

9. Blend according to claim 1, wherein fat B has a melting point of more than 55° C.

10. Process for improving the gloss and for reducing the clumping together or confectionery products, selected from wine-gums, pastils, starch-gelling type sweets, or fruits or raisins, comprising coating the confectionary product, the fruit or the raisins with a thin-layer of the blend of triglycerides according to claim 1.

11. Food products including confectionary products, fruits or raisins having improved gloss and reduced clumping properties, which products are coated with a thin coating-layer with the composition according to claim 1.

12. Blend according to claim 1, wherein the rancimat induction period for A is more than 35 hours and the unstabilized solid fat content of B is more than 60.

13. Blend according to claim 1 wherein less than 20 wt % of the triglycerides present have a melting point of 20°–35° C. and fat A has a $C_{18:2}$-content less than 15 wt %.

* * * * *